United States Patent [19]

Davis et al.

[11] 4,093,041
[45] June 6, 1978

[54] FOOD SERVING SYSTEM

[75] Inventors: Paul Davis, Swampscott; David Schneider, Lexington, both of Mass.

[73] Assignee: Sweetheart Plastics, Inc., Wilmington, Mass.

[21] Appl. No.: 677,972

[22] Filed: Apr. 19, 1976

[51] Int. Cl.² .............................................. E04H 3/04
[52] U.S. Cl. .................................. 186/1 D; 126/268; 206/562; 219/386; 220/21; 312/236; 312/250
[58] Field of Search ........................ 186/1 D, 1 R, 28; 126/268, 261, 246; 219/386, 387, 214; 296/22; 206/72, 562, 563, 564; 220/23.8, 20, 21

[56] References Cited

U.S. PATENT DOCUMENTS

| | | | |
|---|---|---|---|
| 2,625,242 | 1/1953 | Reed | 220/23.8 |
| 3,883,029 | 5/1975 | Wyatt | 220/23.83 |
| 3,886,346 | 5/1975 | Meyers | 219/386 |
| 3,924,100 | 12/1975 | Mack | 219/386 |

*Primary Examiner*—George E. A. Halvosa
*Assistant Examiner*—Reinhard J. Eisenzopf

*Attorney, Agent, or Firm*—Wolf, Greenfield & Sacks

[57] ABSTRACT

A food serving system for delivering prepared meals to locations remote from the point of preparation which includes a mobile cart having its own low voltage rechargeable power pack that may be utilized to make the cart self powered. The cart has a tier of shelves for carrying removable, generally flat, individual, food serving trays. Each shelf is provided with one or more thermally isolated heat transfer devices which may be energized when a tray is placed on the shelf in the cart. The heat transfer devices are intended to maintain the food in selected dishes and bowls at the desired serving temperature for extended periods without affecting the temperature of the foods and beverages in other dishes, bowls and cups on the trays, so that the food remains at the proper serving temperature. In one embodiment the trays have holes at selected locations which allow the dishes directly to engage the heat transfer devices, while in another embodiment the trays have plates of high thermal conductivity, which support the dishes and engage the heat transfer devices.

7 Claims, 10 Drawing Figures

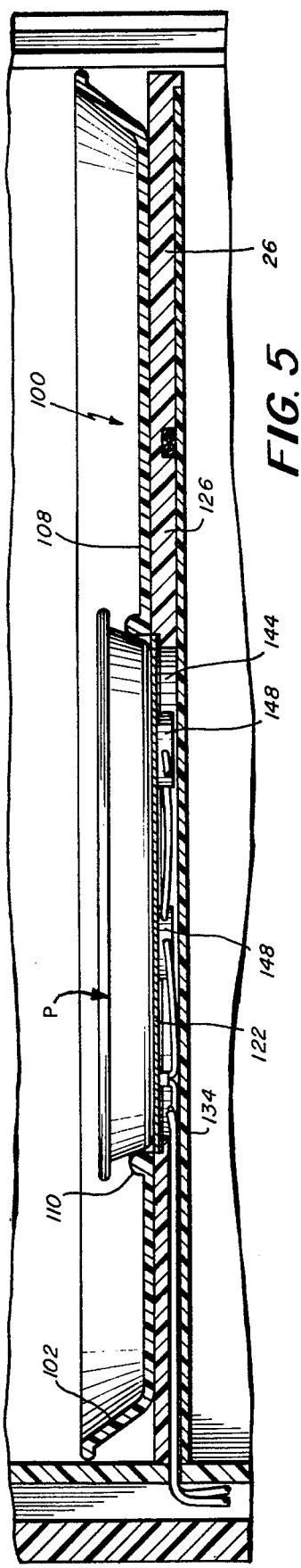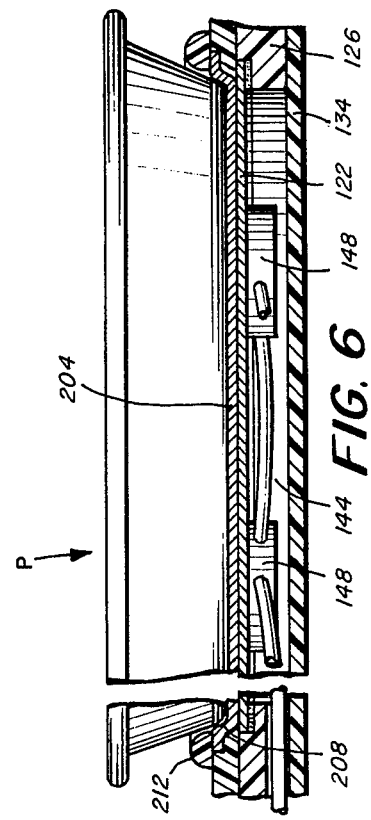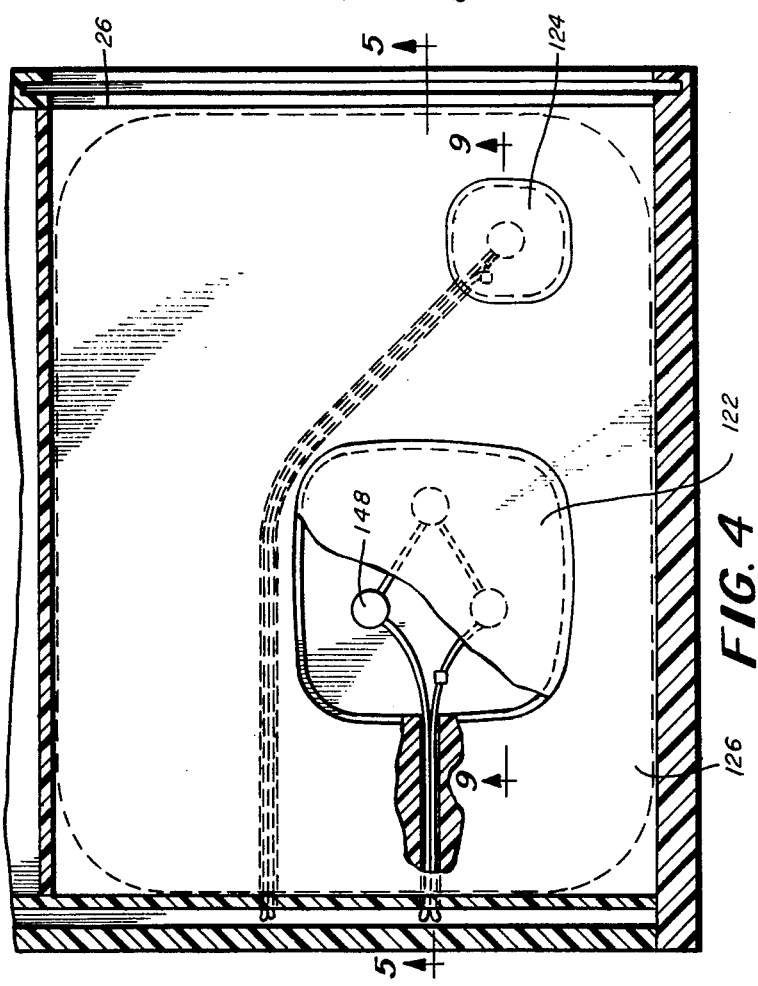

U.S.Patent June 6, 1978 Sheet 3 of 4 4,093,041

FOOD SERVING SYSTEM

BACKGROUND OF THE INVENTION

This invention is a modification of the invention described in co-pending application Ser. No. 468,404 filed May 9, 1974, now issued as U.S. Pat. No. 3,924,100 dated Dec. 2, 1975 and assigned to the assignee of the present application. It relates to the delivery of prepared meals to locations remote from the point of preparation and more particularly comprises a new concept in the feeding of patients in hospitals, nursing homes and other institutions, the feeding of hotel guests in their rooms etc. In the following description the invention is described in terms of its use in a hospital but it is to be borne in mind that the invention has wider applications.

Hospitals use a variety of different systems for serving meals to their patients. These systems generally fall into two categories, frequently identified as centralized and decentralized methods. And the systems in each category include a variety of different techniques intended to bring food to the individual patients at the desired temperature.

In the centralized methods, the food is prepared in a main kitchen where the entire meal is set up on individual patient's trays, and the trays are transported directly to the patients. The heated pellet system, hot and cold cart system, and insulated nestable tray-thermal column system, all used in an effort to maintain the food at the desired temperature are categorized in the centralized system of food distribution.

The decentralized method generally includes two alternative heat systems, namely, conventional and microwave systems. In conventional decentralized systems, the food is prepared in central kitchens and transported in bulk to floor pantries on the different hospital floors where the patients' trays are set up. In the microwave system, the prepared food is either kept in a freezer or refrigerator, and just prior to serving, the food is allowed to thaw and is then heated in a microwave oven in the floor pantry. Thereafter it is promptly delivered to the patient.

All of the various centralized and decentralized systems have disadvantages. For example, the pellet systems employ a metal disc preheated to 250° –450° F. as the heat source in the tray to maintain hot food at the desired temperature, and the pellets constitute a hazard to the patient and kitchen personnel. If the pellets are overheated, they cause the foods to overcook or dry out. The effective temperature retention time is limited to approximately 45 minutes. And the pellets are heavy, adding substantial weight to trays. In hot and cold cart systems, wherein the carts for the trays have separate hot and cold sections, there is a tendency to overcook and dry out the foods in the hot section, and cold and hot foods must be combined on the trays before service. Utility outlets are needed in both the kitchen and on the patients' floors, and the carts normally are on current for 7 or 8 hours daily. And they do not generate heat in transit. The carts are difficult to clean and require substantial maintenance, and the carts are costly, heavy and have limited tray capacity. In insulated tray-thermal column systems wherein the trays nest on top of one another so that all the hot foods stack on top of each other and similarly all the cold foods stack on top of one another to form thermal columns, the trays are bulky, heat is conducted in the tray skins from the hot to the cold columns, and the systems have a limited temperature retention time. Furthermore, without lids on the separate trays, the tray bottoms become soiled from the food in the next lower trays in the stack.

In the decentralized systems, labor costs are relatively high as more people are required to operate the systems, food costs are higher because of waste and unauthorized consumption, food odors are created on separate floors because of the floor pantries, and dish handling noise is created on the floors when china is used.

SUMMARY OF THE INVENTION

One important object of this invention is to upgrade the quality of food service. This object is accomplished first by providing a system wherein the food is served at the intended temperature even though the food may have left the point of preparation an extended period of time before it is actually delivered to the patient. Second, the eating experience is enhanced by providing a system where, in accordance with the preferred form of this invention, the patient is served his food conventionally in separate dishes and bowls rather than in a large, partitioned, unattractive and essentially impersonal tray. In essence the object of this invention is to make the eating experience of patients in institutions as enjoyable as possible. This object is accomplished in part as a result of the wider range of foods available to the hospital (they need not avoid quick cooling food) and the elimination of overheating which destroys both the taste and nutritional value of the food.

To accomplish these and other objects, this invention includes among its features as self-contained mobile cart, separate removable food serving trays for each patient, and individual dishes, plates, bowls, etc. to be carried on the trays and which may be like those used in the home. The cart carries its own rechargeable low voltage power pack, which is designed to supply the necessary energy to maintain the food at the desired temperature. The trays include localized food container supporting areas on which, in accordance with one form of this invention, those plates and dishes containing foods to be heated are placed, to the exclusion of other plates, bowls, dishes, etc. which are carried on other portions of the trays. When the trays are placed in the cart, isolated heat transfer devices disposed in the cart engage the localized food container supporting areas in heat exchange relationship to them so that the dishes, bowls, etc. on the supporting areas are heated. In accordance with one embodiment of this invention, the container supporting areas are defined by openings in the tray which enable the food containers to directly engage the heat transfer devices in the cart so as to heat the food in those containers. In accordance with a second embodiment of this invention, the container supporting areas are defined in part by highly conductive plates which directly contact the heat transfer devices when the tray is in the cart and which are also in direct heat exchange relationship with the food containers. Switching means which may be actuated by placing the tray in the cart activate the heat transfer devices.

The invention of the present application differs from the embodiments shown in U.S. Pat. No. 3,924,100 particularly in that the heat transfer devices are incorporated into the cart as opposed to the trays.

The trays are constructed to carry conventionally styled, removable dishes, bowls, cups, etc., that may be either disposable or reusable, and the dishes and bowls containing foods to be maintained at a reduced or elevated temperature are placed on the trays at selected locations which register with the heat transfer devices on the shelves when the trays are placed on the shelves.

These and other objects and features of this invention will be better understood and appreciated from the following detailed description of several embodiments of the food serving system read in connection with the accompanying drawings.

BRIEF FIGURE DESCRIPTION

FIG. 4 is a fragmentary cross sectional view of a shelf of the cart.

FIG. 5 is an enlarged fragmentary cross sectional view taken along section line 5—5 of FIG. 4 with one embodiment of tray supported on the shelf.

FIG. 6 is a fragmentary cross sectional view similar to FIG. 5 but showing another embodiment of tray.

DETAILED DESCRIPTION

Figure 1:
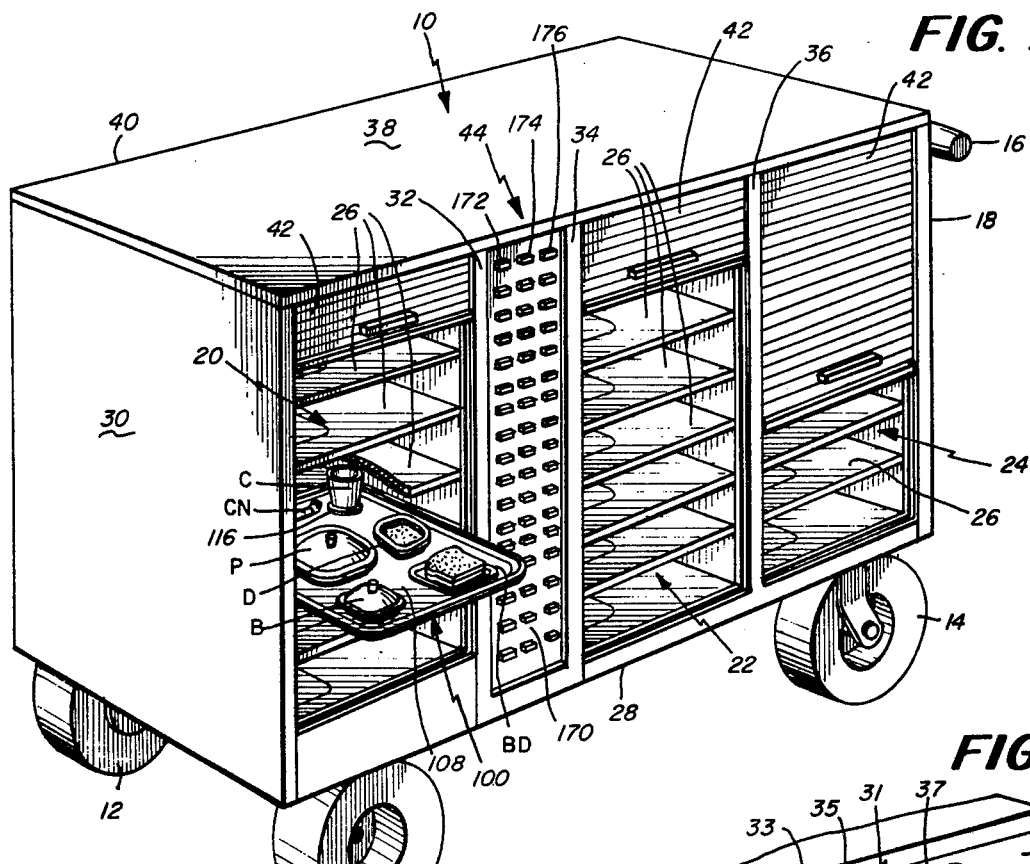
FIG. 1 is a perspective view of a cart and tray of this invention with the tray carrying a number of plates, bowls, etc., partially inserted on its shelf in the cart.
Figure 2:
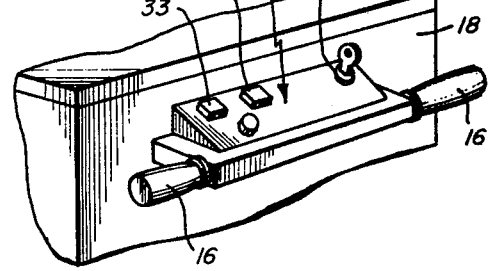
FIG. 2 is a fragmentary view of the operating controls.

In FIG. 1 a cart 10 is shown which is designed to move about the floor of the hospital or other facility employing the feeding system of this invention. The cart illustrated has a pair of fixed axle wheels 12 and a pair of pivotally supported wheels 14 (one shown) to enable the cart to move freely in any direction. A pair of handles 16 are provided at the top of end panel 18 of the cart for the convenience of the operator.

The cart illustrated is shown to have three separate tray compartments 20, 22 and 24, each subdivided by a number of shelves or racks 26 that support the food trays in the compartments. The compartments are collectively defined by the bottom wall 28, end panels 18 and 30, partitions 32, 34 and 36, top wall 38, and rear panel 40. Sliding doors 42 may be incorporated into the cart for closing each of the compartments.

Figure 10:
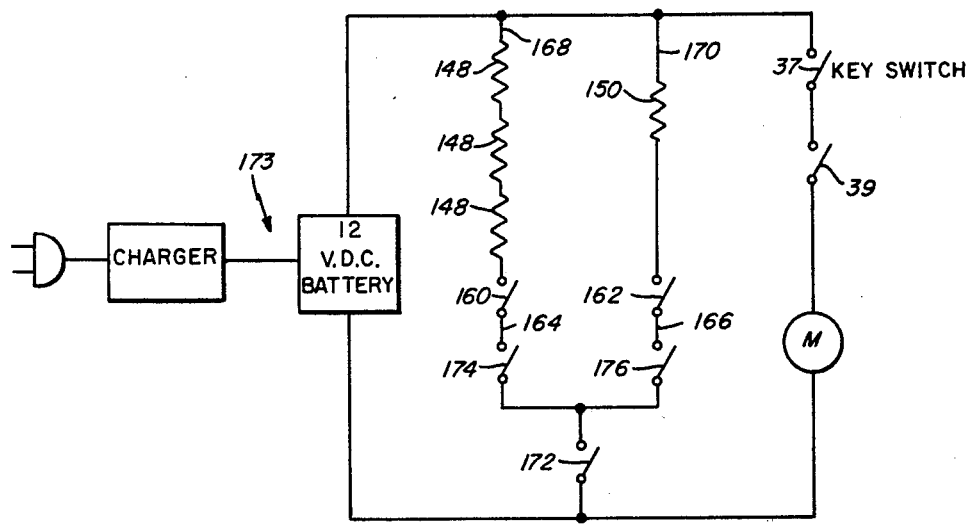
FIG. 10 is a simplified schematic diagram of a portion of the electrical system of this invention.

A power pack and control circuit section 44 forms part of the cart and is mounted between partitions 32 and 34. The power pack and control circuit contained in the section is designed first to supply the energy needed to energize the heat transfer devices on the shelves 26 as is described in greater detail below. The power pack also may serve the additional function of supplying energy to drive the cart. The assembly includes means suggested in FIG. 10 for recharging the power pack from an AC power source. The details of the power pack and control circuit are not part of the present invention.

The control 31 on the end panel 18 of the cart include not only handles 16 but forward and reverse buttons 33 and 35 and a key operated on-off switch 37 as well. Further, the handles 16 may include trigger switches 39 (see FIG. 10) so that the cart may be driven about the hospital floors merely by pressing the "forward" button 33, turning on the key switch 37 and squeezing the handles 16.

All of the shelves and trays of the cart preferably are identical so that the trays may be used interchangeably on any of the shelves in the separate compartments of the cart.

Figure 3:
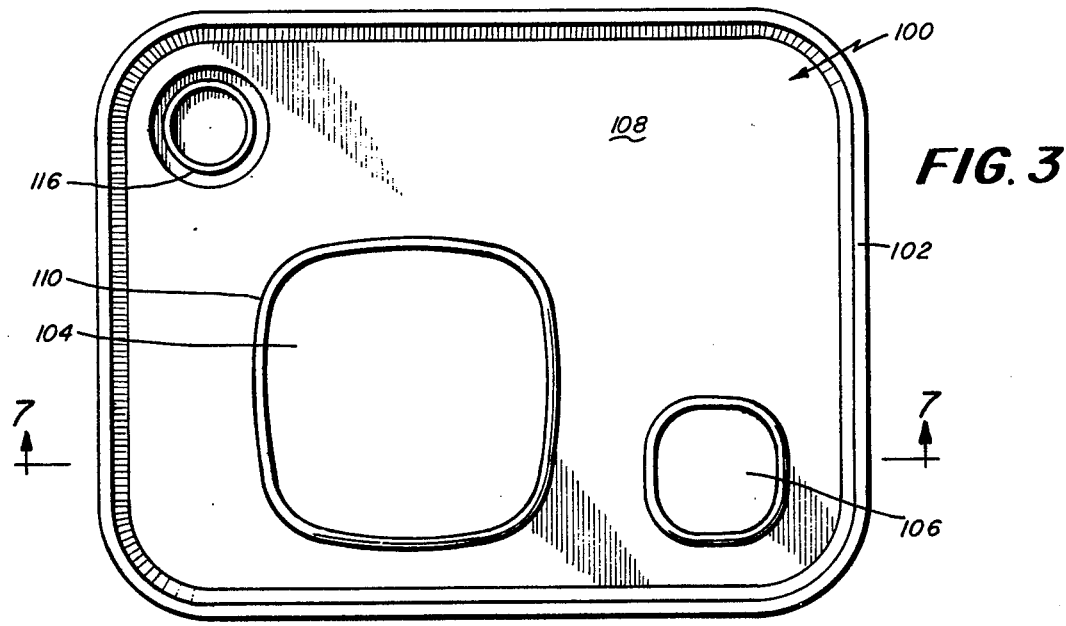
FIG. 3 is a plan view of one tray.

The tray 100 shown in FIG. 3 is rectangular in shape and typically may be approximately 14 by 18 inches. Preferably the dimensions of the tray are the same as conventional food serving trays now in use, and the tray is designed so that it may be used without the cart as a conventional food carrying tray in cafeterias and other central food serving locations in the facility utilized by ambulatory patients, guests, staff, etc. The tray has an upturned rim 102 which extends about its periphery, and the tray body may be made of a high heat distortion, self-extinguishing material such as acrylonitrilebutadiene-styrene (ABS).

Figure 7:
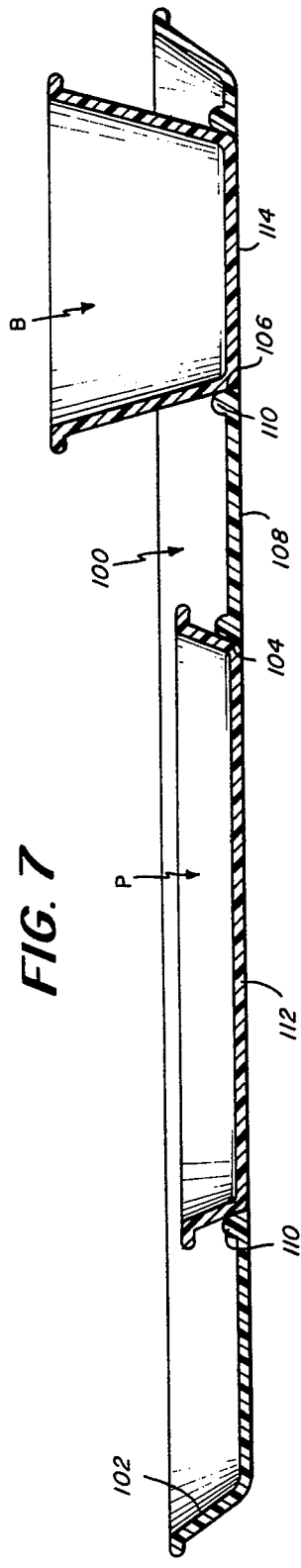
FIG. 7 is a side view, partly in section, of the embodiment of tray shown in FIG. 5 and illustrated carrying a dinner plate and bowl.

As appears in FIG. 7 the tray 100 is provided with two openings 104 and 106 which together comprise a relatively small percentage of the total area of the tray base 108. In the preferred form of this invention each opening is surrounded by a bead 110 for purposes which are made apparent below. The opening 104 is designed to conform to the shape and size of the dinner plate to be used in this system to carry the entree and vegetables of the main course. The smaller opening 106 is shaped and sized to conform to the bottom of the soup bowl to be used in the system.

As shown in FIG. 7, when a plate P and bowl B are respectively placed in the openings 104 and 106, their bottom walls 112 and 114 lie in the same plane or slightly beneath the plane of the main tray surface 108. That is, the lower surface of the bottoms are coincident with or disposed very slightly below the lower surface of the tray bottom 108. The beads 110 which surround the openings may be specially contoured and sized to provide increased contact with the sides of the plate and bowl so as to lend stability to them when the plate and bowl are in place in the openings. The openings 104 and 106 with their surrounding beads thus form food container supporting areas in the tray which are localized and precisely oriented with respect to the entire tray for purposes which will become apparent below.

In FIG. 1 the tray surface 108 is shown to be large enough to carry additional dessert dish D and bread dish BD, cup C and cutlery and napkin CN. Those items may or may not be located on the surface 108 by additional beads formed in the tray. In the preferred form a ring 116 is incorporated into the surface 108 to locate the drinking cup and provide some added stability for it. The ring for that purpose, however, is not an essential feature of the invention. And that ring 116 does not in the embodiments shown surround an opening in the tray as do the beads 110.

Each cart shelf 26 is provided with a pair of spot heaters 122 and 124 that are designed to engage the bottoms of the plate and bowl on the tray when the tray is properly positioned on the shelf. The spot heaters preferably are the same shape and size as the bottoms of the plates and bowls with which they are intended to register. However, it is only necessary that sufficient heat exchange contact be made between the heaters and the bottoms of the plates and bowls in order to transfer the required heat from the heaters to the food in the plates and bowls without melting or otherwise distorting the containers.

Spot heaters 122 and 124 incorporated into the shelves 26 are shown in detail in FIGS. 4 to 6 and 9. The shelf 26 is composed of a main platform 126 provided with openings 130 and 132 whose shape and size define the shape and size of the spot heaters 122 and 124. The platform 126 may be made of the same material as the tray, i.e. ABS, and should be a high heat distortion and self-extinguishing material. The openings 130 and 132 (see FIG. 9) are closed at the bottom by a circuit base 134 secured to the platform 126 and which essentially defines the bottom surface of the shelf. The opening 130 and 132 in the platform 126 are closed by thin aluminum discs 136 and 138 respectively, selected because of their high thermal conductivity. The discs are positioned on shoulders 140 provided in platform 126 about the openings so that the upper surface of each disc is flush with the upper surface of the remaining portion of the shelf. Silicone or some other sealant is provided on the shoulders 140 as suggested at 142 to bond the discs 136 and 138 in place and provide a water tight seal for the chambers under the discs and above the circuit base 134.

The discs 136 and 138 define the tops of two essentially independent chambers 144 and 146. Three equally spaced heating elements 148 are bonded to the under side of disc 136 and a similar element 150 is bonded to the under side of disc 138. The heaters 148 and 150 in the preferred embodiment of this invention are positive temperature coefficient (PTC) pellets of the type manufactured by Texas Instrument Company. The pellets may be approximately ⅜ inch in diameter, and when multiple pellets are used, they are connected in series. The bottoms of the pellets are spaced from the base 134 to form an air gap so as to reduce the los of heat from the pellets through the base.

Figure 9:
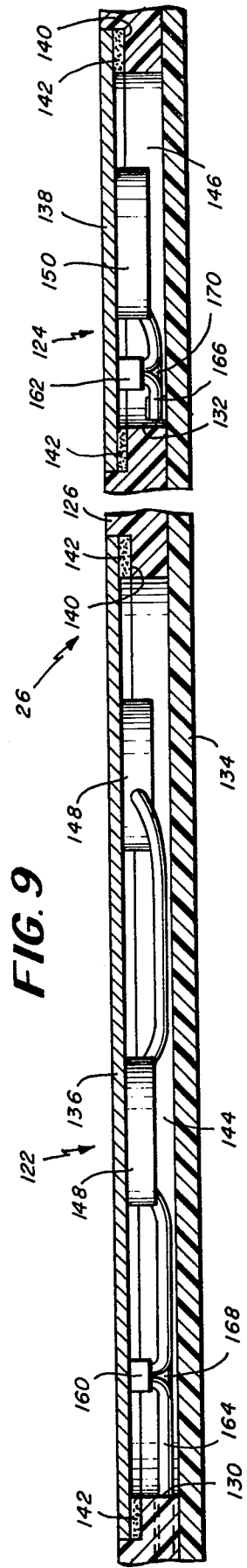
FIG. 9 is a cross sectional view of one shelf of the cart, constructed in accordance with this invention.

In FIG. 9, switches 160 and 162 are also shown secured to the bottom surfaces of the aluminum discs 136 and 138. Switch 160 is connected in series with pellets 148 and switch 162 is in series with pellet 150. The switches are normally open, and close in response to the presence of a tray or container placed on the shelf 26. The switches 160 and 162 may include a blade or other form of actuator which actually senses the presence of the tray or container. It is to be understood that the switches may take several different forms and may be located in different regions of the shelf. In FIG. 9, switch 160 is shown to interrupt lead 164 and switch 162 interrupts lead 166. By means of the leads 164 and 166 along with leads 168 and 170 respectively, the pellets and switches of the respective heaters are connected to the power pack 173 in the control circuit section 44 of the cart. As is described in greater detail below, the respective pellets and pressure sensitive switches of the two heaters are also connected in series with control switches on the front panel of control circuit section 44.

In FIG. 1, the tray 100 is shown to carry dinner plate P and bowl B in the manner illustrated in detail in FIG. 7, as well as cup C, dessert dish D, bread dish BD, and cutlery and napkin CN. The cup C is positioned by ring 116 as suggested above. When the tray is fully inserted on the shelf and properly oriented on it by means of engagement with the rear and side walls of the compartment in which the shelf is mounted (or by other special guides), the bottoms of the plate P and bowl B precisely register with discs 136 and 138 of the heaters in the shelf. In FIG. 5 plate P is shown to be so positioned. And the presence of the plate and bowl, closes normally opened switches 160 and 162 so that upon actuation of the appropriate push button switches in the control panel of section 44 the heaters may be energized to maintain the temperature of the food in the plate and bowl at the desired level. However, because of the low thermal conductivity of the material from which the remainder of the shelf and tray are made, no heat is conducted or otherwise transmitted to cup C, dessert dish D and bread dish BD, and therefore the food carried in them is not affected by the heaters. Consequently, the gelatin dessert, ice cream, or some other cold food in the dessert dish D and the butter pad in the bread dish BD and the cold drink in the cup C do not melt or become warm, but rather remain at their desired temperatures. Of course, an additional heater may be included in the shelf with an appropriate opening provided in the tray beneath the cup C so that heat may be supplied to the cup contents if desired.

As suggested above, the control circuit section 44 has a control logic panel 170 that includes three columns of push button switches 172, 174 and 176. Each horizontal row of switches (one switch in each of the columns) represents the controls for the heaters in a single shelf. The switches in column 172 may be the "off" switches for each shelf, while the switches in columns 174 and 176 may be the "on" switches for each of the heaters 122 and 124, respectively, that are independently operated. Of course a different switch arrangement may be used. The switches in columns 174 and 176 are of course mechanically coupled to the switches in column 172 so as to override the "off" switch for a shelf when either of the "on" switches is pressed. The circuits for the heaters are suggested in the circuit diagram of FIG. 10.

The PTC pellets 148 and 150 are basicly multi-modal resistance heaters. Below their critical temperature which may range from 120° to 400° F. depending upon composition, they have a low electrical resistance, while above it the resistance is very high. Near the critical temperature, the resistance varies between extremes. Therefore, depending upon temperature a PTC heater will deliver different wattages. If the plate or bowl in contact with the disc to which the pellets are connected is colder than intended so as to cool the PTC heater below its critical temperature, the heater will operate at a high wattage, the PTC material will become hot and it will in turn quickly heat the bowl or plate on the disc and, ultimately, the wattage will decrease and the system will come to equilibrium. At equilibrium the heater will operate at just enough wattage to keep the food warm without overcooking it.

This characteristic of PTC heaters may be utilized not merely to maintain the temperature of hot foods as described above, but also to reconstitute cold food to the desired serving temperature. A cold dinner plate, for example, at a temperature of 40° F. placed on heater disc 136 may be heated to the 140° – 150° F. range in less than one hour. Such a system will thus enable institutions to buy frozen meals from independent food preparing firms and eliminate its own cooking facilities. Essentially, the establishment utilizing the system would set up the tray with cold food and after a prescribed period the reconstituted food would be delivered to the patient. It is within the scope of this invention that the cart could during the initial heating period, be connected to line voltage through a transformer and then during the delivery period be switched to its own power pack.

While in the preferred form of this invention, the PTC pellet heaters are utilized as the heat source, it should be appreciated that other heaters may be used such as simple resistance heaters. Printed circuit heaters as well as foil heaters of the type shown in U.S. Pat. No. 3,397,301 fall within the class of resistance heaters contemplated. These heaters get hot when electric current is passed through them, and they provide a fixed amount of heat assuming that the voltage source is fixed. To control the heat output of these resistance heaters, a thermostat may be used to turn the heaters on and off at selected low and high temperature levels. Thus, a resistance heater and thermostat combination may be used in place of the PTC pellets of the preferred form of this invention.

Figure 8:
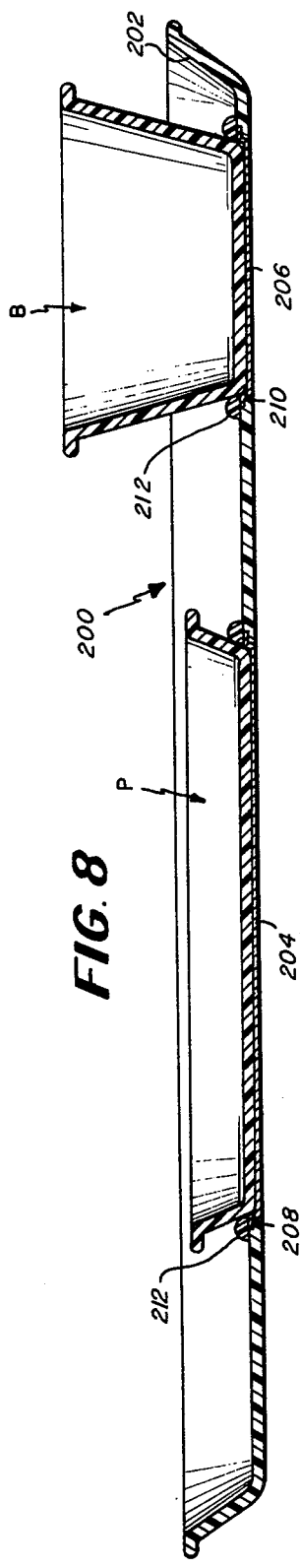
FIG. 8 is a side view, partly in section, of the embodiment of tray shown in FIG. 6 and illustrated carrying a dinner plate and bowl.

In FIG. 8 another embodiment of tray is shown which may be used in combination with the cart 10. In this embodiment, the tray does not have holes through which the bottoms of the containers supported on it and to be heated are exposed, but rather highly conductive discs are provided in the tray, which support plate P and bowl B and which in turn register with discs 136 and 138 of the heaters on the shelf of the cart.

The tray 200 has an upturned rim 202 and has the overall shape and size of the tray shown in FIG. 3. Thin aluminum discs 204 and 206 are provided in the tray 200 and which are intended respectively to support dinner plate P and the soup bowl B. Discs 204 and 206 are provided with upturned edges 208 and 210 respectively which serve to precisely position the plates and bowls on the discs so that they in turn will receive maximum heat from the heaters in the shelf 26 of the cart when the tray is placed on the shelf. Beads 212 may be provided in the tray to anchor the discs 204 and 206 in place and further position the bowl and plate. In all other respects the tray may be just like that shown in FIGS. 3 and 5.

In use, the tray 200 differs from the tray 100 only in that the plate and bowl supported on it are in indirect contact with the heater discs 136 and 138; with tray 100 the plate and bowl rather are in direct contact with the heat discs 136 and 138.

Because the heat is transmitted in each embodiment of this invention by conduction from the heaters to the foods in the dishes and bowls, little or no loss of efficiency occurs in the heating process even with the introduction of a fan or other appliance which either prevents the buildup of heat or intentionally cools the compartments in the cart to reduce the ambient temperature.

From the foregoing description, it will be appreciated that the advantages sought by the present invention are achieved. Of significance is the fact that the food may be served to the patient in conventional dishes and bowls so that he is not made to feel "different". The trays themselves although different in detail from so called conventional trays, do not have a "foreign" or strange appearance. The trays can be disposable or reusable. Of primary importance is the fact that the food is served to the patient at the desired temperature. And while in the foregoing description the use of plastic dishes and plates is suggested it should be appreciated that regular chinaware or glassware may be used with so long as proper contact is made between the bottom of the dishes and the heat source, albeit the added expense of washing is incurred.

It should also be appreciated that the trays may be decorated by coloring, texturing, or printing so as to make them most attractive. The aluminum discs could be porcelainized or enameled to match or contrast with the main tray body.

And while the cart is described as having a control panel with button actuated switches for the heaters in the shelves, it should be appreciated that the heaters could be made to operate automatically without the usual manually operated buttons. For example, a thermostatic element could be positioned in contact with the aluminum discs in the shelves and sense the temperature of a cold or hot dish in direct or indirect contact with it, and open or close the heater circuits as desired.

Because numerous modification has been made of this invention without departing from its spirit, we do not intend to limit the scope of this invention to the embodiments illustrated and described. Rather, it is intended that the scope of this invention be determined by the dependent claims and their equivalents.

What is claimed is called:
1. A food serving system comprising
   a mobile cart constructed and arranged to be rolled about the floor of an institution such as a hospital.
   a low voltage rechargeable power pack on the cart,
   an array of racks for food serving trays arranged in the cart,
   a plurality of substantially identical food serving trays constructed and arranged to fit on and be removed from the racks,
   at least one localized food container supporting area in each tray for orienting a container in a prescribed position on the trays,
   electric heaters fixed to the cart and positioned to be in heat exchange relation with containers on the food container supporting areas on the trays when the trays are on the racks,
   and an opening in each tray at the container supporting area for enabling the container on the area to directly engage the heater.
2. A food serving system comprising
   a mobile cart constructed and arranged to be rolled about the floor of an institution such as a hospital,
   a low voltage rechargeable power pack on the cart,
   an array of racks for food serving trays arranged in the cart,
   a plurality of substantially identical food serving trays constructed and arranged to fit on and be removed from the racks,
   at least one localized food container supporting area in each tray for orienting a container in a prescribed position on the trays,
   electric heaters fixed to the cart and positioned to be in heat exchange relation with containers on the food container supporting areas on the trays when the trays are on the racks,
   and a good heat conducting plate forming part of the supporting area in each tray, and adapted to engage a heater when the tray is placed on a rack,
   said trays being formed of a heat insulating material.
3. A food serving system comprising
   a housing and a food tray supporting means carried by the housing,
   a heat transfer device mounted on the housing,
   a food serving tray constructed and arranged to fit on the supporting means and adapted to be carried about and transport a plurality of food containers,
   at least one localized food container supporting area on the tray for supporting a food container in heat exchange relationship with the heat transfer device when the tray is disposed on the support means,
   an opening in the tray at the container supporting area for causing the container on the supporting area to engage the heat transfer device when the tray is on the support means.

4. A food serving system comprising
a housing and a food tray supporting means carried by the housing,
a heat transfer device mounted on the housing,
a food serving tray constructed and arranged to fit on the supporting means and adapted to be carried about and transport a plurality of food containers,
at least one localized food container supporting area on the tray for supporting a food container in heat exchange relationship with the heat transfer device when the tray is disposed on the support means,
a heat conducting plate forming part of the supporting area and positioned to engage a container disposed in the area in heat exchange relationship,
said plate engaging the heat transfer device when the tray is on the support means,
said tray being formed of a heat insulating material, 5. A food serving system comprising
a mobile cart constructed and arranged to be rolled about the floor of an institution such as a hospital,
food serving trays having selected food supporting areas on which food to be heated is to be placed and other areas where food to remain unheated is to be placed,
shelves in the cart for supporting the trays,
at least one localized heater mounted in each shelf and registering with the food supporting areas of the trays when the trays are properly oriented on the shelves,
said trays and shelves being made of low heat conducting material so as to retard the transfer of heat laterally on the shelves and trays to foods on said other areas of the trays,
said heaters including a supporting disc made of a material having high thermal conductivity,
at least one multi-modal resistance heater bonded to the lower surface of the discs,
said food supporting areas including openings in the trays for enabling the containers for the foods in the areas in the tray to engage the heater supporting discs when the trays are on the shelves.

6. A food serving system comprising
a mobile cart constructed and arranged to be rolled about the floor of an institution such as a hospital,
food serving trays having selected food supporting areas on which food to be heated is to be placed and other areas where food to remain unheated is to be placed,
shelves in the cart for supporting the trays,
at least one localized heater mounted in each shelf and registering with the food supporting areas of the trays when the trays are properly oriented on the shelves,
said trays and shelves being made of low heat conducting material so as to retard the transfer of heat laterally on the shelves and trays to foods on said other areas of the trays,
said heaters including a supporting disc made of a material having high thermal conductivity,
at least one multi-modal resistance heater bonded to the lower surfaces of the discs,
said food supporting areas including discs made of material having high thermal conductivity,
said food supporting area discs engaging the heater discs when the trays are on the shelves.

7. A food serving tray comprising a body of heat insulating material defining a lower surface and an upper surface for carrying hot and cold food in serving containers,
said body having a first food supporting area on said upper surface and carrying means for positioning a food serving container thereon and a second food supporting area on said upper surface laterally spaced from said first area,
said first food supporting area comprising a metallic insert extending from said upper to said lower surface and having high thermal conductivity properties to enable direct heat transfer through said body by conduction.

* * * * *